(12) United States Patent
Chen et al.

(10) Patent No.: US 8,731,987 B2
(45) Date of Patent: May 20, 2014

(54) METHOD AND APPARATUS TO AUTOMATICALLY RECOVER WELL GEOMETRY FROM LOW FREQUENCY ELECTROMAGNETIC SIGNAL MEASUREMENTS

(75) Inventors: Jiuping Chen, Albany, CA (US); Ping Zhang, Albany, CA (US); Michael Wilt, Walnut Creek, CA (US); Edward Nichols, Berkeley, CA (US); David Alumbaugh, Berkeley, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1326 days.

(21) Appl. No.: 11/745,181

(22) Filed: May 7, 2007

(65) Prior Publication Data

US 2008/0281667 A1    Nov. 13, 2008

(51) Int. Cl.
*G06Q 10/00* (2012.01)

(52) U.S. Cl.
USPC .............. 705/7.12; 702/8; 702/9; 702/11; 702/38

(58) Field of Classification Search
USPC ................................. 703/10; 702/6
See application file for complete search history.

(56) References Cited

U.S. PATENT DOCUMENTS

| | | | |
|---|---|---|---|
| 4,875,015 A | 10/1989 | Ward | |
| 5,892,362 A | 4/1999 | Warren et al. | |
| 2004/0239329 A1* | 12/2004 | Haber et al. | 324/339 |
| 2006/0015257 A1* | 1/2006 | Hassan et al. | 702/6 |

FOREIGN PATENT DOCUMENTS

| | | |
|---|---|---|
| GB | 2355535 | 4/2001 |
| WO | WO0248743 | 6/2002 |

OTHER PUBLICATIONS

Oldenburg and Li, "Inversion induced polarization data," *Geophysics*, 59(9):1327-1341, 1994.
Wilt and Alumbaugh, "Oil field reservoir characterization and monitoring using electromagnetic geophysical techniques," *J. Petroleum Science & Engineering*, 39:85-97, 2003.
Notification on Results of Patentability Check of Russian Application No. 2009145087 received Jan. 24, 2013.

* cited by examiner

*Primary Examiner* — David Rines (57) ABSTRACT

A technique that is usable with a well includes providing a model so predict measurements that are received by receivers due to transmissions by sources based on estimated positions of the receivers relative to the sources. The estimated positions each have at least two dimensions. At least some of the receivers and the sources are located in the well. On a computer, the estimated positions are automatically refined based on a comparison of the predicted measurements and actual measurements that are obtained by the receivers.

19 Claims, 8 Drawing Sheets

FIG. 15

US 8,731,987 B2

METHOD AND APPARATUS TO AUTOMATICALLY RECOVER WELL GEOMETRY FROM LOW FREQUENCY ELECTROMAGNETIC SIGNAL MEASUREMENTS

BACKGROUND

The invention generally relates to a method and apparatus to automatically recover well geometry from low frequency electromagnetic signal measurements, and more particularly, the invention relates to a method and apparatus to automatically recover receiver and/or transmitter positions for purposes of performing crosshole electromagnetic tomography.

Crosshole electromagnetic tomography is an example of a conventional technique that may be used to characterize an oil reservoir. In this technology, electromagnetic waves typically are communicated between two wellbores that are in proximity to the oil reservoir of interest. The electromagnetic waves are altered by the reservoir in a manner that identifies certain properties of the reservoir. Therefore, measurements of electromagnetic waves that are communicated through the reservoir may be processed to develop a two or three dimensional image, or survey, of the reservoir.

A typical application of crosshole electromagnetic tomography involves the use of a receiver tool that is run into one wellbore and a transmitter tool that is run into another wellbore. The transmitter tool, as its name implies, transmits electromagnetic waves, and the receiver tool performs measurements of the resulting received electromagnetic waves. Conventionally, crosshole electromagnetic tomography may involve varying the positions of the receiver and transmitter tools during the gathering of the measurement data so that a given measurement may be associated with a particular transmitter position and a particular receiver position. After the measurements are taken, a crosshole survey may be developed based on the receiver and transmitter positions and the measurement data.

A challenge in using crosshole electromagnetic tomography is accurately determining the receiver and transmitter positions. Traditional techniques to determine these positions typically involve manual data fitting, which may consume a considerable amount of time.

Thus, there is a continuing need for better ways to determine the relative positions of receivers and/or transmitters that are used in crosshole electromagnetic tomography.

SUMMARY

In an embodiment of the invention, a technique that is usable with a well includes providing a model to predict measurements that are received by receivers due to transmissions by sources based on estimated positions of the receivers relative to the sources. The estimated positions each have at least two dimensions. At least some of the receivers and the sources are located in the well. On a computer, the estimated positions are automatically refined based on a comparison of the predicted measurements and actual measurements that are obtained by the receivers.

In another embodiment of the invention, a computer readable storage medium stores instructions that when executed cause a processor-based system to provide a model to predict measurements that are received by receivers due to transmissions by sources based on estimated positions of the receivers relative to the sources. The estimated positions each have at least two dimensions. At least some of the receivers and the sources are located in a well. The instructions when executed cause the processor-based system to automatically refine the estimated positions based on a comparison of the predicted measurements and actual measurements that are obtained by the receivers.

In yet another embodiment of the invention, a system that is usable with a well includes a model to predict measurements that are received by receivers due to transmission by sources based on estimated positions of the receivers relative to the sources. The estimated positions each have at least two dimensions. At least some of the receivers and the transmitters are located in the well. The system also includes a computer-based calculator to automatically refine the estimated positions based on a comparison of the predicted measurements and actual measurements that are obtained by the receivers.

Advantages and other features of the invention will become apparent from the following drawings, description and claims.

DETAILED DESCRIPTION

Figure 1:
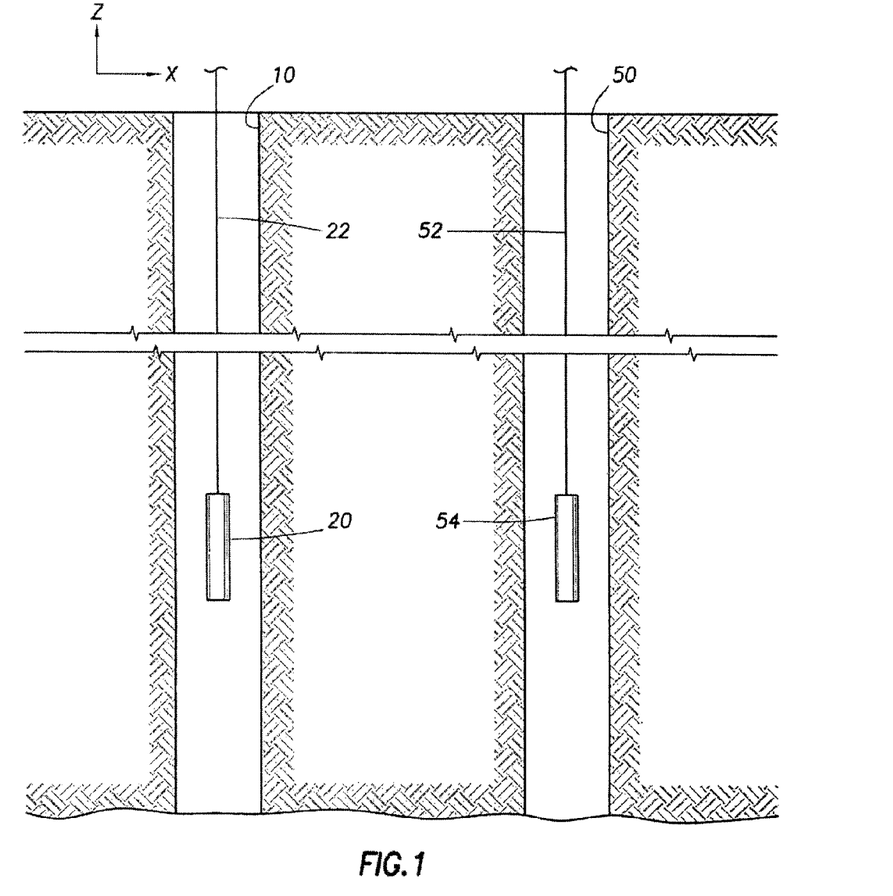
FIG. 1 is a schematic diagram of a well field according to an embodiment of the invention.

Referring to FIG. 1, an exemplary embodiment of a well field in accordance with the invention includes two wellbores 10 and 50. It is noted that the well field may be a subterranean or subsea well field, depending on the particular embodiment of the invention. For purposes of obtaining a crosshole electromagnetic survey, a wireline-based (as an example) tool 20 may be lowered into the wellbore 10 via a wireline 22 (as an example). The tool 20 includes at least one transmitter that is capable of transmitting electric and magnetic fields through one or more formations between the wellbores 10 and 50. The transmissions by the transmitter tool 20 produce electric and magnetic fields that are measure by a receiver tool 54 that is located in the other wellbore 50. Depending on the particular embodiment of the invention, the receiver tool 54 measure the electric fields; magnetic fields; or both the electric and magnetic fields that are produced by the transmitter tool's transmissions.

In accordance with some embodiments of the invention, the transmitter tool 20 controllably traverses a targeted region of the wellbore 10, and while traversing the targeted region, the transmitter tool 20 generates several electromagnetic transmissions. Each of these transmissions may occur at a different transmitter position, in accordance with some embodiments of the invention. The position of the receiver tool 50 may likewise be varied as the transmitter tool 20 transmits, and thus, the receiver tool 50 may in a similar manner by associated with several receiver positions.

Alternatively, in other embodiments of the invention, the receiver tool 54 and/or transmitter tool 20 may be stationary and include multiple receivers (for the receiver tool 54) or transmitters (for the transmitter tool 20). However, regardless of the particular movement or construction of the transmitter 20 and receiver 54 tools, the measurement data is associated with multiple transmitter positions and multiple receiver positions, i.e., each measurement may be associated with a different pair of transmitter and receiver positions.

In order to process the measured data for purposes of obtaining a crosshole resistivity image, the receiver and transmitter positions must be obtained. In accordance with some embodiments of the invention, the transmitter positions are assumed, and the receiver positions (relative to the transmitter positions) are obtained by solving an inversion problem that is set up using low frequency crosshole electromagnetic data that is obtained in a prior run into the well. More specifically, in this initial run, the transmitter tool 20 generates low frequency transmissions (transmissions in the range of approximately 5 to 20 Hertz (Hz), for example), which are not significantly affected by the electromagnetic properties of the formation(s) between the wellbores 10 and 50. The result is a collection of receiver measurement data that is used (as described below) to determine the relative receiver positions. A subsequent run into the wellbore 10 (using higher frequency transmissions) is then performed to obtain measurement data for purposes of generating the crosshole electromagnetic survey.

As described herein, a computer-implemented inversion process is used to obtain the receiver positions (i.e., the receiver positions relative to the transmitter positions) from the low frequency crosshole electromagnetic data. The positions may be two or three dimensional positions, depending on the particular embodiment of the invention. For embodiments of the invention in which the positions are two dimensional positions, each receiver position is defined by a depth coordinate (a z coordinate) and a separation coordinate (an x coordinate).

As described below, the low frequency crosshole measurement data forms the basis for an inverse problem, which is solved automatically be a computer for the receiver positions. More specifically, in accordance with some embodiments of the invention, the transmitter tool 20 may be viewed as being a vertical magnetic dipole, and each transmitter location is assumed to be known. The computer also implements a forward modeling engine that is used to generate the theoretical magnetic and/or electric field (depending on the measurements taken); and the unknowns for the inversion problem are the separation (x coordinates) and depth shift (z coordinates) between the transmitter and receiver positions (for embodiments of the invention in which two dimensional positions are determined). This means that there are two unknowns for each receiver position, relative to the z 12 and the x 14 axes that are depicted in FIG. 1.

In the inverse problem, the objective function consists of two parts: a data misfit and model constraints. The goal is to minimize the data misfit, subject to the recovered geometry having a smooth structure. The trade-off between these two parts is to choose an appropriate regularization parameter. The regularization parameter and the overall inversion process are described in more detail below.

Figure 2:
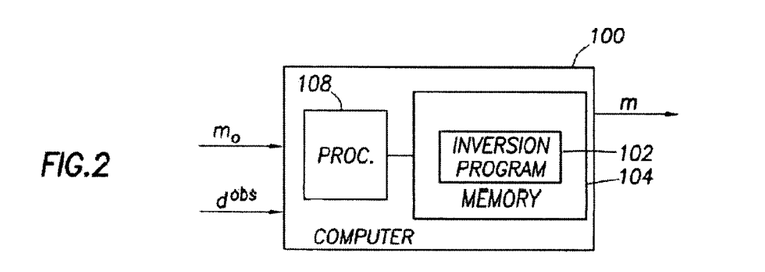
FIG. 2 is a schematic diagram of a computer according to an embodiment of the invention.
Figure 3:
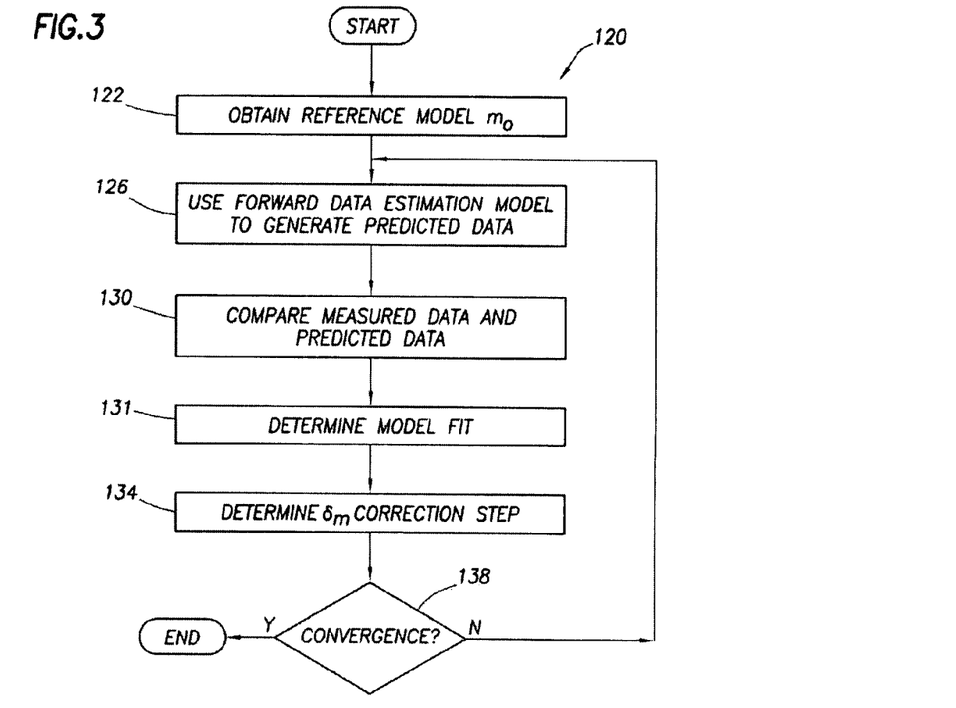
FIG. 3 is a flow diagram depicting a technique to obtain positions of receivers used in the generation of a crosshole electromagnetic survey according to an embodiment of the invention.

Referring to FIG. 2, in accordance with some embodiments of the invention, the inversion problem is solved in an automated fashion on a computer 100. In this regard, the computer 100 has a processor 108 (one or more microprocessors or microprocessor cores, as an example) that executes an inversion program 102 (a single application program, several application programs that uses external mathematical function libraries, etc.) that is stored in a memory 104 of the computer 100. More specifically, the computer 100 receives an initial reference model (called "$m_o$"), which is the initial estimate of the relative receiver positions. The initial reference model $m_o$ may be obtained by prior knowledge of the well geometry, such as knowledge obtained via a prior logging run, for example. The computer 100 also receives data (called "d" in FIG. 2), which represents the observed, or actual, data that is measured by the receiver tool 54 due to the transmissions by the transmitters. The inversion process produces a model (called "m" in FIG. 2) of the receiver positions, which is automatically refined via iterations that are performed by the computer 100 until convergence occurs (as described further below); and when convergence occurs, the model m indicates the final calculated receiver positions FIG. 3 is a technique 120 that generally represents the inversion process that is performed by the computer 100 (see FIG. 2) by executing the inversion program 102, according to an embodiment of the invention. Pursuant to the technique 120, the computer 100 obtains the initial reference model $m_o$ pursuant to block 122. Next, the computer 100 performs iterations for purposes of determining the receiver positions. Each iteration includes using (block 126) a forward data estimation model to predict the measurement data based on the current model m. The computer 100 then compares parameters (described below), pursuant to block 130, to characterize the data misfit (a measure of how close the predicted data is to the measured data) and, pursuant to block 131, the model "fit". Based on these parameters, the computer 100 determines a correction step (called "$\delta_m$" in block 134 of FIG. 3). The $\delta_m$ correction step represents a correction in the receiver positions to be applied to the current model m. If the computer 100 determines that the convergence has not occurred (pursuant to diamond 138), then the computer 100 begins another iteration (with the updated model m), beginning with block 126.

Figure 4:
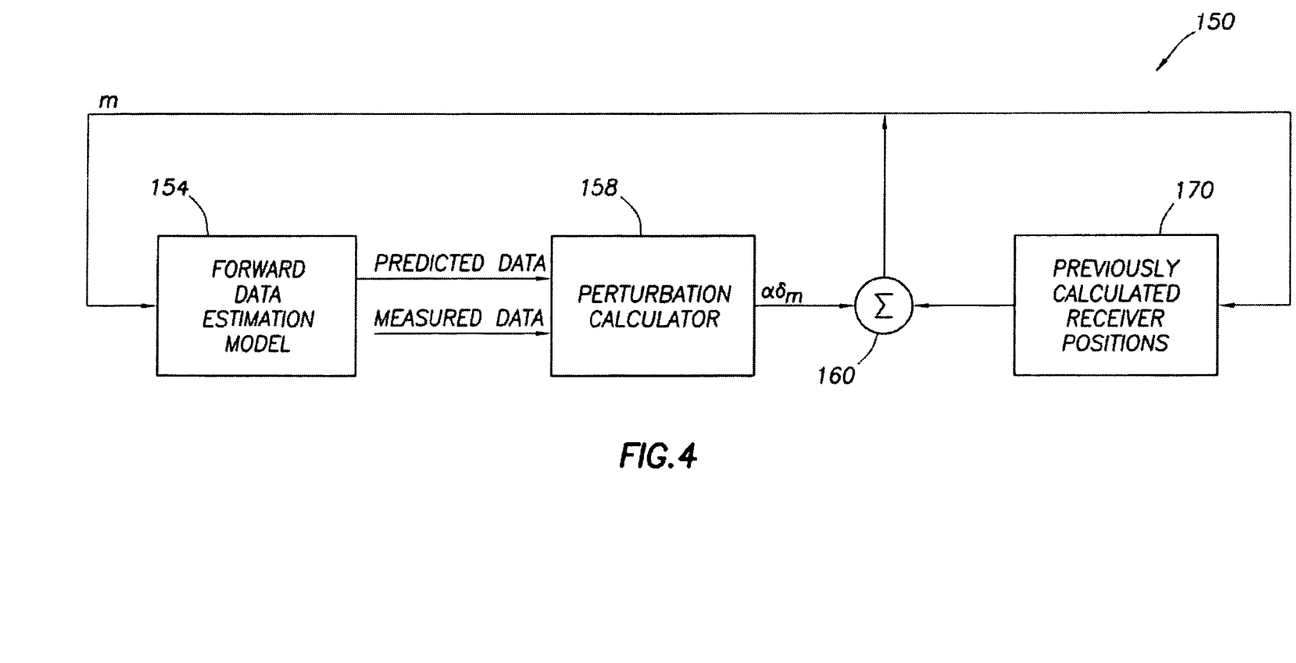
FIG. 4 is a block diagram of a software architecture to obtain the receiver positions according to an embodiment of the invention.

FIG. 4 depicts a generalized software architecture 150 that may be used to calculate the receiver positions (i.e., the final model m) according to some embodiments of the invention. The software architecture 150 includes a forward data estimation model 154 that receives the current model m. From this model, the forward data estimation model 154 generates predicted data. A perturbation calculator 158 generates a correction step ("$\delta_m$") in response to the predicted data, the measured data and the smoothness model constraints. The previously calculated receiver positions 170 are then adjusted using the output from the perturbation calculator 158 (i.e., by an adder 160 that adds a scaled version of the ƒm factor with the previously calculated receiver positions 170 to generate the new model m. The new model m is used by the forward data estimation model 154 (as the current model m) to perform another iteration until convergence occurs.

The following describes the mathematics behind the inversion process. The inverse problem is formulated as an optimization problem, and a corrected receiver geometry is formed that minimizes an objective function $\phi(m)$, which is described below:

$$\phi(m) = \phi_d(m) + \beta\phi_m(m), \qquad \text{Eq. 1}$$

where m is the model (or receiver geometry) parameter vector of size M (twice the number of receiver positions), which is arranged as follows:

$$m = [x_1, x_2, \ldots x_{Nrx}, y_1, y_2, \ldots y_{Nrx}, z_1, z_2, \ldots z_{Nrx}]^T \qquad \text{Eq. 2}$$

The superscript "T" denotes a transpose operation. The first term "$\phi_d$" on the right-hand side of Eq. 1 is the $l_2$-norm measure of data misfit, which is described below:

$$\phi_d = \|W_d(d - d^{obs})\|^2, \qquad \text{Eq. 3}$$

where "d" is the vector containing the N observations (where "N" is the product of the number of transmitter positions and the number of receiver positions) of the measurement data, and "d" is the vector of predicted data (called "F[m]"). The vector d is described below:

$$d = [H_1^1, H_2^1, \ldots, H_{Nrx}^1, H_1^2, H_2^2, \ldots, \ldots H_{Nrx}^{Ntx}]^T, \qquad \text{Eq. 4}$$

In Eq. 4, each "H" element represents a magnetic and/or electric field measurement that is associated with a particular receiver location (denoted by the subscript) and a particular transmitter location (denoted by the superscript). As further described below, the d data vector may be pure magnetic fields (for a theoretical study, or simulated inversion mode), fields normalized by a response at a specific transmitter-receiver pair (for an open-open hole inversion mode), or fields normalized by a response for a specific transmitter for each receiver (for an open-cased hole inversion mode), or double ratio-ed fields (for a cased-cased hole inversion mode). An open hole can be a fibre-glass-cased hole. As cased hole specifically means a steel-cased hole.

In Eq. 3, the matrix "$W_d$" is a diagonal matrix whose elements are the reciprocals of the estimated standard deviations of the noise in the observations.

The second term in the right-hand side of Eq. 1 is the model objective function (or smoothness constraints), which is described below:

$$\phi_m = \|W_m(m - m_0)\|^2, \qquad \text{Eq. 5}$$

where "$W_m$" represents the finite-difference discretization of a desired regularization functional. A gradient may be used as that functional, in accordance with some embodiments of the invention. The choice of the reference model $m_o$ reflects the prior knowledge on the receiver geometry and may be obtained from the output of actual data acquisition.

The parameter "$\beta$" in Eq. 1 is a Lagrange multiplier trade-off parameter, which is chosen such that the data are adequately fit, and, at the same time, the recovered geometry has a minimum structure.

Taking the derivative of $\phi$ in Eq. 1 with respect to m and setting the result to zero yields the necessary condition for a minimum.

$$J^T W_d^T W_d(F[m] - d^{obs}) + \beta W_m^T W_m(m - m_0) = 0, \qquad \text{Eq. 6}$$

where J is a sensitivity matrix (or Jacobian matrix) of size N×M, which has the following elements:

$$J_{ij} = \frac{\partial d_i}{\partial m_j}, \qquad \text{Eq. 7}$$

Calculation of J may be done using the finite-difference approximation by perturbating receiver x, y, and z in turns. More details on calculating J are described below.

Performing a first-order Taylor expansion of F[m] about $m^w$, the model at the nth iteration may be described as follows:

$$F[m] = F[m^{(n)}] + J(m - m^{(n)}) = F[m^{(n)}] + J\delta m, \qquad \text{Eq. 8}$$

Inserting Equation 8 into Equation 6 leads to a Gause-Newton solution for the model perturbation $\delta m$ correction step, as described below:

$$(J^T W_d^T W_d J + \beta W_m^T W_m)\delta m = \qquad \text{Eq. 9}$$
$$-J^T W_d^T W_d[F[m^{(n)}] - d^{obs}] - \beta W_m^T W_m(m^{(n)} - m_0),$$

In accordance with some embodiments of the invention, a pragmatic, simple cooling process may be used to determine the $\beta$ Lagrange multiplier. More specifically, $\beta^w$ is set to a large value, which is determined by $$\beta^{(0)} = \begin{cases} \phi_d^{(0)}/\phi_m^{(0)}, & \text{if } \phi_m^{(0)} \neq 0 \\ \phi_d^{(0)}, & \text{if } \phi_m^{(0)} = 0 \end{cases}, \qquad \text{Eq. 10}$$

where $\phi^w$ and $\phi_m$ are the initial data misfit and model norms, respectively.

The resultant large initial Lagrange multiplier $\beta$ makes the coefficient matrix in Eq. 9 diagonally dominated, and thus, the computer 100 (FIG. 2) is always possible to obtain a correction step $\delta m$. The computer 100 performs a check to determine if the current model reduces the data misfit or not.

If the misfit is reduced, compared with the previous one, the computer 100 updates the model m, decreases the Lagrange multiplier β by a predetermined factor (such as "2," for example), and then begins the next iteration. Otherwise, the computer 100 reduces the correction step and checks the misfit again. The computer 100 repeats this process until the target misfit is achieved, in accordance with some embodiments of the invention.

Because the unknown number in Eq. 9 may be on the order of one hundred (for example), use of the singular value decomposition to solve the linear equations is efficient. Once the computer 100 determines the perturbation δm, the computer 100 updates the receiver geometry as follows:

$$m_{k+1} = m_1 + \alpha \delta m, \qquad \text{Eq. 11}$$

where "α" is a constant step length. As an example, a α=0.6 may be used in accordance with some embodiments of the invention. Ideally, a weak line search would serve this purpose.

When dealing with measured data in crosshole electromagnetics, there may be complications, such as the calibration factor of the receiver sensor (which may not be known) and the casing effect. Therefore, the computer 100 (via its execution of the inversion program 102) may be placed in one of various inversion data modes, according to some embodiments of the invention: a simulated inversion data mode; an open-open measured inversion data mode; and open-cased measured inversion data mode; and cased-cased measured inversion data mode.

The simulated inversion data mode is for synthetic investigation of the inversion technique. The data are the pure magnetic field component expressed in amperes per meter (A/m). This means the data used in the inversion may be expressed as follows:

$$d = F[m], \qquad \text{Eq. 12}$$

where "F[m]" represents the forward modeling operator. The elements of sensitivity matrix J, for example, the derivative with respect to receiver separation x, may be approximated using the centered-finite difference formula (second order of accuracy) as follows:

$$J = \frac{\partial d}{\partial x} = F[x+0.5, y, z] - F[x-0.5, y, z]. \qquad \text{Eq. 13}$$

The computer 100 may then use the sensitivity matrix J of Eq. 13 to recover the receiver geometry as described above.

The computer 100 uses the open-open measured inversion data mode when both transmitter and receiver tools are in open holes or fiber glass cased holes. The data represents the measured magnetic field in Volts or millivolts (mV). In this case, it may be assumed that the receiver sensors have an identical calibration factor, or the calibration factor discrepancy may be removed by smoothing in the pre-processing. This means the difference between the measured data $\tilde{d}$ in Volts and the corresponding magnetic field in A/m lies in a constant (calibration factor) for all transmitter-receiver location pairs, as described as follows:

$$\tilde{d} = C * F[m]. \qquad \text{Eq. 14}$$

A straightforward way to get rid of the "C" constant in Eq. 14, is to define the datum in the inversion as follows:

$$d = \frac{\tilde{d}}{\tilde{d}_{ref}} = \frac{F[m]}{F[m_{ref}]}, \qquad \text{Eq. 15}$$

where "$m_{ref}$" denotes a reference point or transmitter-receiver pair from which all the data are normalized by the response at this point.

Consequently modification is made to the sensitivity element (with respect to x) as follows:

$$J = \frac{\partial d}{\partial x} = \frac{1}{F[m_{ref}]}\{F[x+0.5, y, z] - F[x-0.5, y, z]\}. \qquad \text{Eq. 16}$$

By doing this, the computer 100 may determine the receiver geometry without knowing the calibration factor for the receiver sensor.

The computer 100 uses the open-cased measured inversion data mode when the transmitter tool 20 is in an open hole, and the receiver tool 54 is in a steel (or other conductor or high magnetic permeability material) cased hole. The measured magnetic data are in Volts or mV. In this specific case, besides the calibration factor, the casing affects the measurements. The reasoning here is that the measured data at one receiver location may be expressed as follows:

$$\tilde{d}(x, y, z; Tx) = C * K(x, y, z) * F[m; Tx], \qquad \text{Eq. 17}$$

where "Tx" represents the transmitter location; "C" represents a constant calibration factor; and "K(x, y, z)" represents the casing effect, which is also constant for a given receiver and different transmitters, but will change with receiver locations. To remove C and K, the datum in the inversion may be represented as follows:

$$d = \frac{\tilde{d}(x, y, z; Tx)}{\tilde{d}(x, y, z; Tx_{ref})} = \frac{F[m; Tx]}{F[m; Tx_{ref}]}, \qquad \text{Eq. 18}$$

where "$Tx_{ref}$" represents the reference transmitter-receiver pair location for the normalization, but is different for different receiver locations due to the casing.

Similarly the sensitivity element needs to be changed accordingly as follows:

$$J = \frac{\partial d}{\partial x} = \frac{F[x+0.5, y, z; Tx]}{F[x+0.5, y, z; Tx_{ref}]} - \frac{F[x-0.5, y, z; Tx]}{F[x-0.5, y, z; Tx_{ref}]} \approx \\ \frac{1}{F[x, y, z; Tx_{ref}]}\{F[x+0.5, y, z; Tx] - F[x-0.5, y, z; Tx]\} \qquad \text{Eq. 19}$$

For the cased-cased node, the measured magnetic data are also recorded in Volts or mV. In this specific case, besides the calibration factor, both the transmitter casing and receiver casing affect the measurements. Here the measured data at one receiver location may be expressed as follows:

$$\tilde{d}(x, y, z; Tx) = C * K_{tx}(Tx) * K_{rx}(x, y, z) * F[m; Tx], \qquad \text{Eq. 20}$$

where "Tx" represents the transmitter location; "C" represents a constant calibration factor; "$K_{tx}(Tx)$" represents the casing effect at transmitter "Tx", which is constant with different receivers, but will change with transmitter locations; and "$K_{tx}(x, y, z)$" represents the casing effect at the receiver (x, y, z), which is constant with different transmitters, but will change with receiver locations. To remove C, $K_{tx}(Tx)$ and $K_{tx}(x, y, z)$, the datum in the inversion may be represented as follows:

$$d = \frac{\tilde{d}(x, y, z; Tx)}{\tilde{d}(x, y, z; Tx_{ref})} \cdot \frac{\tilde{d}(Rx_{ref}; Tx_{ref})}{\tilde{d}(Rx_{ref}; Tx)} = \qquad \text{Eq. 21}$$

$$\frac{F[m; Tx]}{F[m; Tx_{ref}]} \cdot \frac{F[Rx_{ref}; Tx_{ref}]}{F[Rx_{ref}; Tx]},$$

where "$Tx_{ref}$" represents the reference transmitter location for the normalization, and $Tx_{ref}$ is fixed for different receiver locations; "$Rx_{ref}$" represents the reference receiver location for the normalization, and $Rx_{ref}$ is fixed for different transmitter locations Similarly the sensitivity element needs to be changed accordingly as follows:

$$J = \frac{\partial d}{\partial x} = \frac{F[Rx_{ref}; Tx_{ref}]}{F[Rx_{ref}; Tx]} \cdot \qquad \text{Eq. 22}$$

$$\left\{ \frac{F[x+0.5, y, z; Tx]}{F[x+0.5, y, z; Tx_{ref}]} \frac{F[x-0.5, y, z; Tx]}{F[x-0.5, y, z; Tx_{ref}]} \right\}$$

$$\approx \frac{F[Rx_{ref}; Tx_{ref}]}{F[Rx_{ref}; Tx]} \cdot \frac{1}{F[x, y, z; Tx_{ref}]}$$

$$\{F[x+0.5, y, z; Tx] - F[x-0.5, y, z; Tx]\}$$

With this implementation, the computer 100 may determine the receiver geometry without knowing the calibration factor and the casing effect due to the cased receiver and transmitter holes.

Below are described three data sets, corresponding to three of the above-described inversion data modes, to demonstrate the performance to the developed inversion code.

Figure 5:
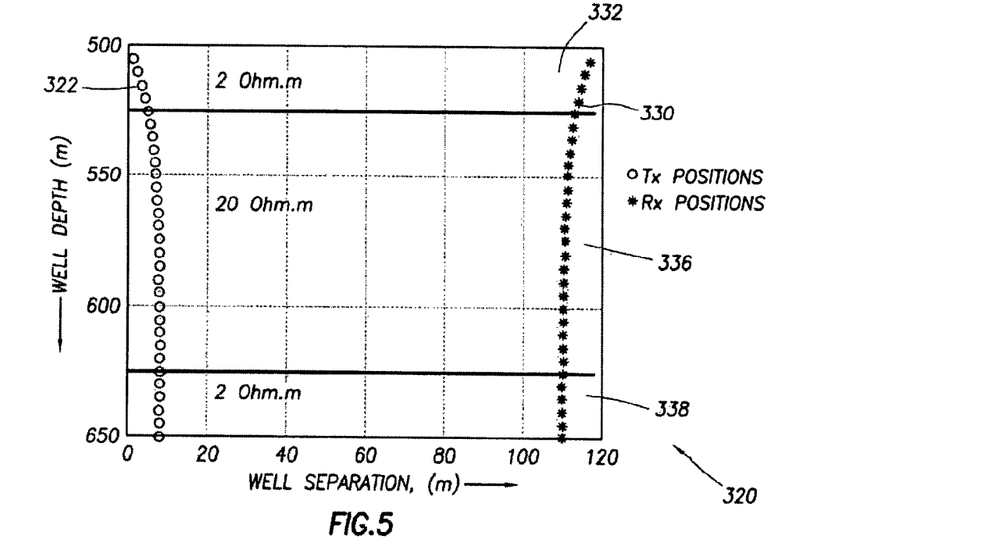
FIG. 5 is a schematic diagram of an exemplary simulated well depicting actual transmitter and receiver geometry according to an embodiment of the invention.

FIGS. 5, 6, 7, 8 and 9 illustrate calculation of the receiver geometry by the computer 100 for a synthetic, or simulated, dataset (i.e., the computer 100 is in the simulated inversion data mode). More specifically, FIG. 5 depicts the actual geometry of receivers and transmitters that are deployed in two well bores. In this regard, for the simulation 30 transmitter locations 322 are in a first borehole, and 30 receiver locations 330 are in a second borehole. The formation has three layer 332, 336 and 338 with resistivities of 2, 20, and 2 ohm-m, respectively. The frequency for the measurements was 50 Hz. The simulation used a pore vertical magnetic field (both real and imaginary parts) in addition to 0.5% random noise as the data.

Figure 6:
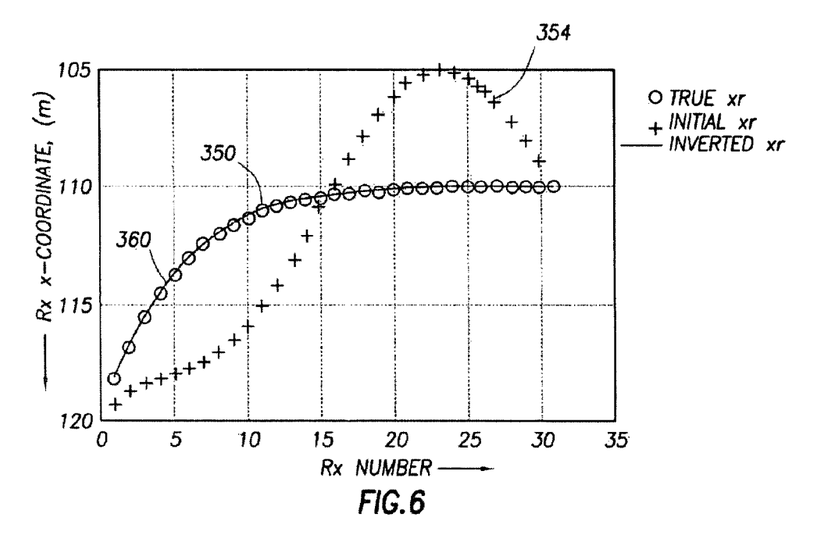
FIGS. 6, 7, 8 and 9 are schematic diagrams illustrating a computer-implemented inversion technique to determine receiver positions in the well of FIG. 5 according to an embodiment of the invention.
Figure 7:
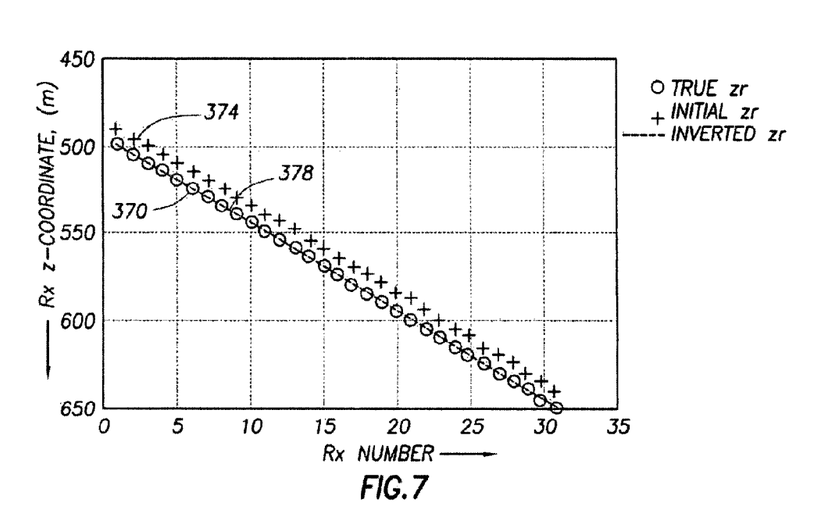
Figure 8:
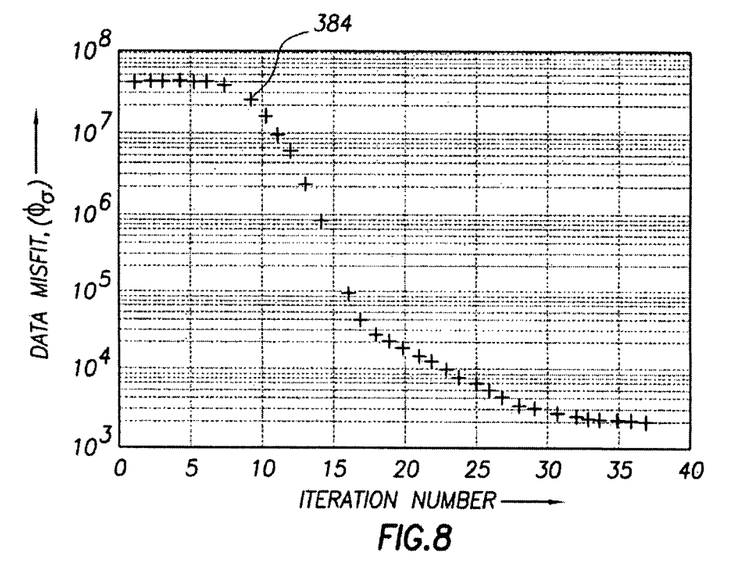
Figure 9:
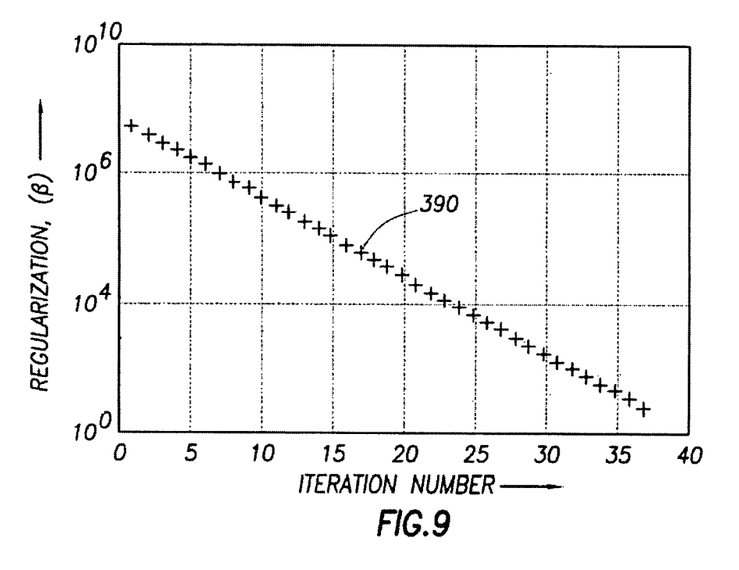
Figure 10:
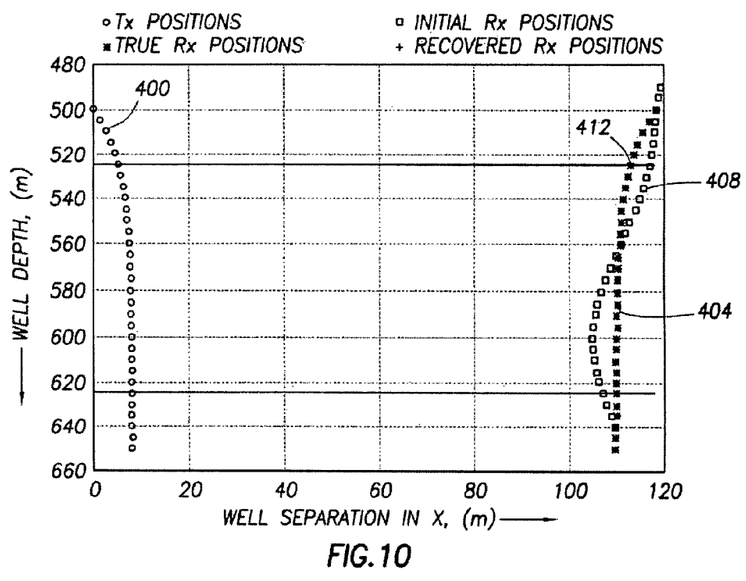
FIG. 10 is another schematic diagram of the well of FIG. 5 depicting a comparison between the actual, initial and final calculated geometries according to an embodiment of the invention.

For the simulation, the initial receiver position $m_o$ were intentionally shifted in both separation and depth. More specifically, FIG. 6 depicts the initial 354 and true, or actual, 360 x coordinates of the receiver positions; and FIG. 7 depicts initial 374 and true 370 z coordinates of the receiver positions. FIG. 8 depicts a plot 384 of the data misfit versus the iteration number; and FIG. 9 depicts a plot 390 of the Lagrange multiplier β versus the iteration number. FIGS. 6 and 7 also depict the x 350 (FIG. 6) and z 378 receiver coordinates obtained through the inversion process that is performed by the computer 100. As shown in FIGS. 6 and 7, the x 350 and z 378 coordinates that are obtained by the inversion process closely follow the true x 360 and z 370 coordinates, respectively. FIG. 10 is a two dimensional depiction of the well geometry, showing two dimension transmitter positions 400 (known), two dimensional initial receiver positions Mo 408, two dimensional receiver positions 412 received using the automated inversion process and the true two dimensional receiver positions 404. After 37 iterations, the target data misfit was reached. As shown in FIG. 10, the recovered receiver positions 412 obtained via the above-described inversion process closely follow the true receiver positions 404.

Figure 11:
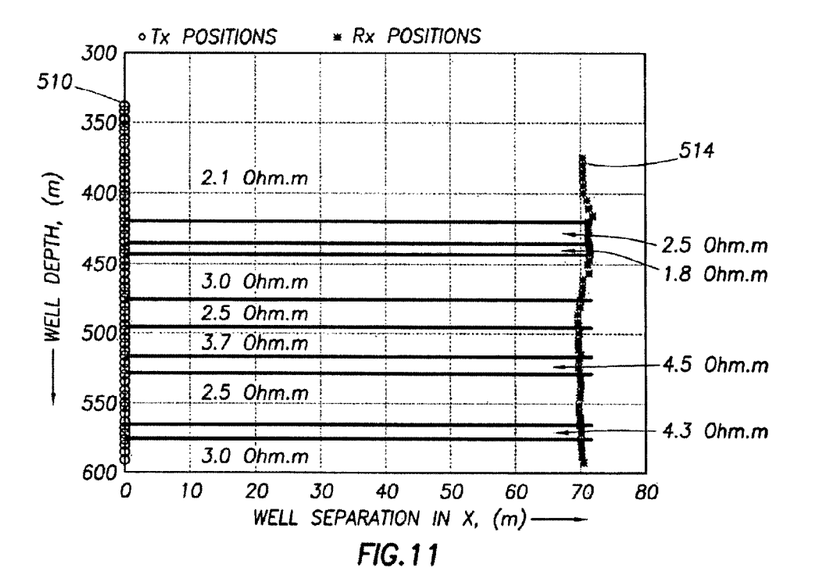
FIG. 11 is a schematic diagram of an exemplary actual well having open boreholes, and depicting actual transmitter and receiver geometries according to an embodiment of the invention.
Figure 12:
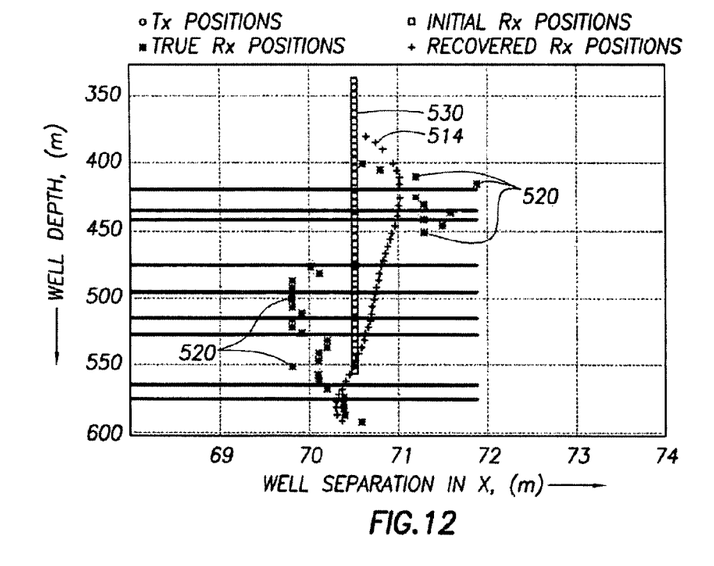
FIG. 12 is a schematic diagram of the well of FIG. 11 depicting the actual, initial and calculated receiver positions according to an embodiment of the invention.

FIGS. 11 and 12 are a dataset obtained from a real well field, in which the open-open inversion mode was used. The frequency of the electromagnetic transmission was 23 Hz.

FIG. 11 depicts true, or actual, transmitter positions 510 and true, or actual, receiver positions 514. As shown in FIG. 11, the transmitter 510 and receiver 514 positions traverse different layers of resitivity.

FIGS. 12 depicts initial receiver positions 530 and true, or actual, receiver positions 514 that were obtained via a manual fitting. FIG. 12 also depicts the recovered receiver positions 520 that were obtained via the above-described inversion process.

Figure 13:
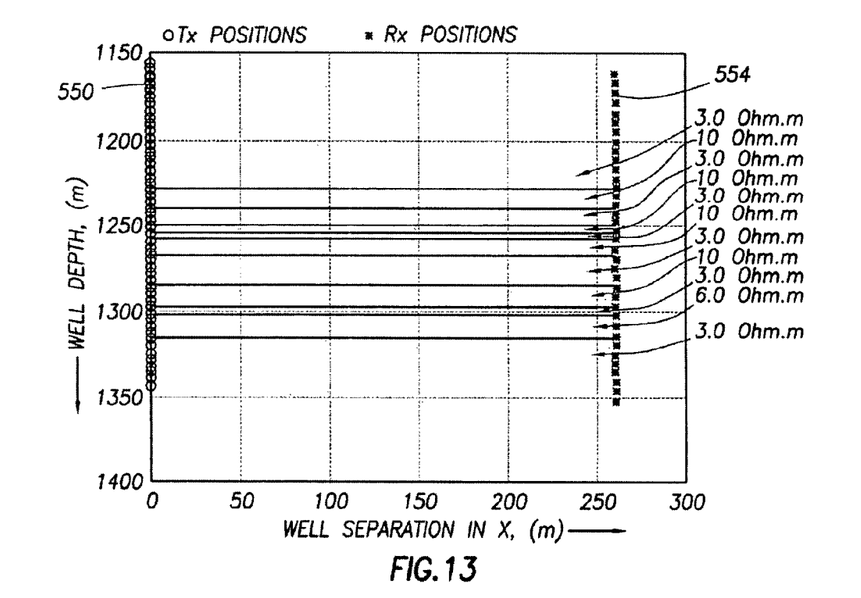
FIG. 13 is a schematic diagram of an exemplary actual well having open and cased boreholes, and depicting actual transmitter and receiver geometries according to an embodiment of the invention.
Figure 14:
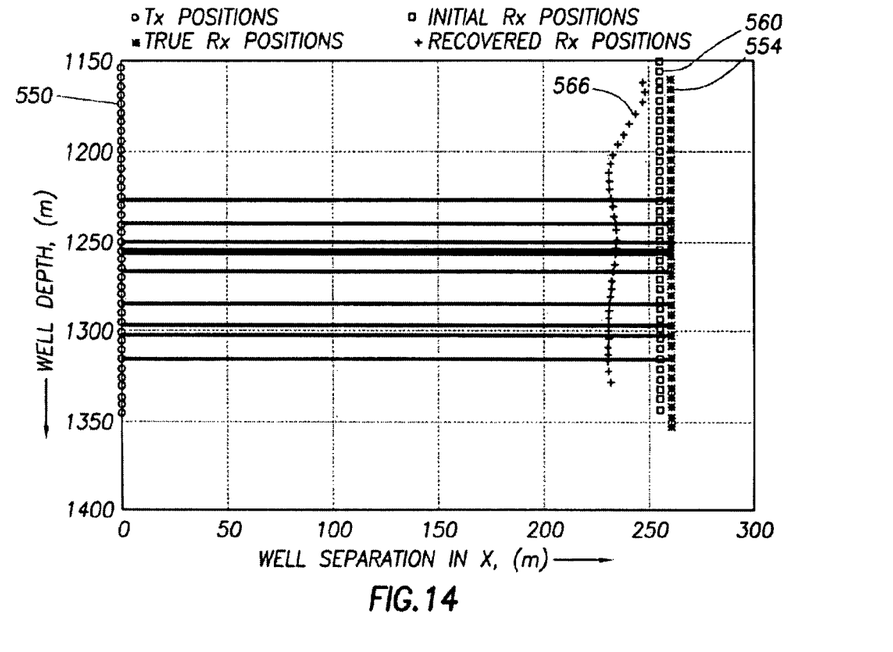
FIG. 14 is a schematic diagram of the well field of FIG. 13 illustrating the actual, initial and calculated receiver positions according to an embodiment of the invention.

FIGS. 13 and 14 depict an actual dataset obtained in an open-cased inversion mode. For this example, 39 transmitter positions 550 (see FIG. 13) and 36 receiver positions 554 were used. Furthermore, the dataset was performed in an eleven-layer formation at a frequency of 104 Hz. FIGS. 13 and 14 depict actual 554 receiver positions obtained in manual data fitting and transmitter positions 550. FIG. 14 also depicts initial receiver positions 560 and the recovered 566 receiver positions obtained via the inversion.

Figure 15:
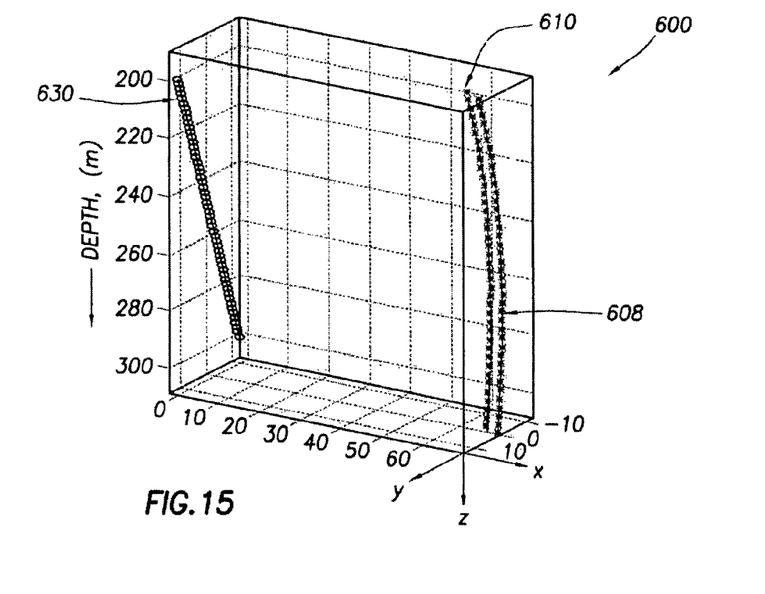
FIG. 15 is a schematic diagram of an exemplary well field illustrating three dimensional actual, initial and calculated receiver according to an embodiment of the invention.

Many other embodiments are possible and are within the scope of the appended claims. As examples, the above-described automated inversion technique may be applied to calculate a particular well geometry in three dimensions and may be applied to just a single wellbore. More specifically, although two dimension positions were disclosed herein for purposes of simplifying the discussion, it is understood that the equations in the inversion may be modified to reflect three dimensional geometry positions for the receivers. Thus, referring to FIG. 15, in accordance with some embodiments of the invention, a three dimensional plot 600 may indicate three dimensional initial receiver positions 608, three dimensional true or recovered receiver positions 610 and three dimensional transmitter positions 630.

In accordance with some embodiments of the invention, the receivers may be located on a seabed, and the transmitters may be obtained in a wellbore that extends beneath the seabed. In another embodiment of the invention, the receivers may be located in a wellbore, and the transmitters may be moved using a towed surface array or an airplane-based array, depending on the particular embodiment of the invention. Additionally, the positions of the receivers may be assumed, and the positions of the transmitters may be determined in the inversion process by a computer. Thus, many variations are possible and are within the scope of the appended claims.

While the present invention has been described with respect to a limited number of embodiments, those skilled in the art having the benefit of this disclosure, will appreciate numerous modifications and variations therefrom. It is intended that the appended claims cover all such modifications and variations and fall within the scope of this present invention.

What is claimed is:

1. A method usable with a well in a formation, comprising:
providing a model to predict measurements received by receivers based upon generated low frequency transmissions by sources, wherein said model to predict measurements is based on estimated positions of the receivers relative to the sources, each of the estimated positions being at least two dimensional positions and at least some of the receivers and the sources being located in the well; wherein receipt of said low frequency transmissions is not adversely affected by the electromagnetic properties of the formation; and
on a computer, automatically refining the estimated positions, based on the predicted measurements and actual measurements obtained by the receivers to determine refined estimated positions of the sources relative to the receivers,
wherein the act of automatically refining comprises:
minimizing an objective function, the objective function being indicative of at least a calculated misfit between the predicted measurements and the actual measurements; and
performing iterations on the computer, the performance of each iteration comprising using the model to provide the predicted measurements based on estimated positions obtained from a prior iteration and adjusting the estimated positions to reduce the objective function.

2. The method of claim 1, wherein the objective function is indicative of a smoothness of a geometry collectively represented by the estimated positions.

3. The method of claim 1, wherein the providing comprises executing software on the computer.

4. The method of claim 1, wherein either all of the receivers or all of the sources are located in the well.

5. The method of claim 4, wherein the other of all of the receivers or all of the sources are located in another well.

6. The method of claim 4, wherein the other of all of the receivers or all of the sources are not located in a well.

7. The method of claim 1, wherein low frequency transmissions are in the range of approximately 5 to 20 Hertz (Hz).

8. An article comprising a non-transitory computer readable storage medium storing instructions that when executed cause a processor-based system to:
predict measurements received by receivers based upon low frequency transmissions by sources, wherein said model to predict measurements is based on estimated positions of the receivers relative to the sources, each of the estimated positions being at least two dimensional positions and at least some of the receivers and the sources being located in a well in a formation, wherein receipt of said low frequency transmissions is not adversely affected by the electromagnetic properties of the formation; and
refine the estimated positions, based on the predicted measurements and actual measurements obtained by the receivers to determine based refined estimated positions of the sources relative to the receivers,
wherein the instructions when executed cause the processor-based system to:
minimize an objective function, the objective function being indicative of at least a calculated misfit between the predicted measurements and the actual measurements; and
perform iterations on the computer, the performance of each iteration comprising using the model to provide the predicted measurements based on estimated positions obtained from a prior iteration and adjusting the estimated positions to reduce the objective function.

9. The article of claim 8, wherein the objective function is indicative of a smoothness of a geometry collectively represented by the estimated positions.

10. The article of claim 8, wherein either all of the receivers or all of the sources are located in the well.

11. The article of claim 10, wherein the other of all of the receivers or all of the sources are located in another well.

12. The article of claim 11, wherein the other of all of the receivers or all of the sources are not located in a well.

13. The article of claim 8, wherein low frequency transmissions are in the range of approximately 5 to 20 Hertz (Hz).

14. A system usable with a well in a formation, comprising:
a source and a plurality of receivers;
a computer-generated model to predict measurements received by the receivers based upon low frequency transmissions by sources, wherein said model to predict measurements is based on estimated positions of the receivers relative to the source, each of the estimated positions being at least two dimensional positions and at least some of the receivers and the sources being located in the well; wherein receipt of said low frequency transmissions is not adversely affected by the electromagnetic properties of the formation; and
a processor to automatically refine the estimated positions, based on the predicted measurements and actual measurements obtained by the receivers to determine refined estimated positions of the sources relative to the receivers,
wherein the processor:
minimizes an objective function, the objective function being indicative of at least a calculated misfit between the predicted measurements and the actual measurements; and
performs iterations on a computer, the performance of each iteration comprising using the model to provide the predicted measurements based on estimated positions obtained from a prior iteration and adjusting the estimated positions to reduce the objective function.

15. The system of claim 14, wherein the objective function is indicative of a smoothness of a geometry collectively represented by the estimated positions.

16. The system of claim 14, wherein either all of the receivers or the source are located in the well.

17. The system of claim 16, wherein the other of all of the receivers or the source are located in another well.

18. The system of claim 16, wherein the other of all of the receivers or the source are not located in a well.

19. The system of claim 14, wherein low frequency transmissions are in the range of approximately 5 to 20 Hertz (Hz).

* * * * *